United States Patent
Fisher et al.

(10) Patent No.: US 10,711,877 B2
(45) Date of Patent: Jul. 14, 2020

(54) PASSIVE LUBRICATION SYSTEM FOR GAS TURBINE ENGINE GEARBOX DURING WIND MILLING

(71) Applicant: General Electric Company, Schenectady, NY (US)

(72) Inventors: Kenneth Lee Fisher, Schenectady, NY (US); George Hanna Ghanime, Ballston Spa, NY (US); Bugra Han Ertas, Niskayuna, NY (US); Darren Lee Hallman, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/903,110

(22) Filed: Feb. 23, 2018

(65) Prior Publication Data
US 2019/0264800 A1    Aug. 29, 2019

(51) Int. Cl.
| F16H 57/04 | (2010.01) |
| F01D 25/20 | (2006.01) |
| F02C 7/06 | (2006.01) |
| F02C 7/36 | (2006.01) |
| F01D 25/18 | (2006.01) |

(52) U.S. Cl.
CPC ......... *F16H 57/0435* (2013.01); *F01D 25/18* (2013.01); *F01D 25/20* (2013.01); *F02C 7/06* (2013.01); *F02C 7/36* (2013.01); *F16H 57/0423* (2013.01); *F16H 57/0424* (2013.01); *F16H 57/0486* (2013.01); *F05D 2260/4031* (2013.01); *F05D 2260/98* (2013.01)

(58) Field of Classification Search
None
See application file for complete search history.

(56) References Cited

U.S. PATENT DOCUMENTS 4,169,519 A * 10/1979 Hirt ..................... F16H 57/0456
184/6.12
5,121,815 A    6/1992 Francois et al.
(Continued)

OTHER PUBLICATIONS

Hudgins et al., "Loss-of-Lubrication of Helicopter Transmissions", Journal of the American Helicopter Society, pp. 01-10, Oct. 1982.
(Continued)

*Primary Examiner* — Dirk Wright
(74) *Attorney, Agent, or Firm* — Dority & Manning, P.A.

(57) ABSTRACT

A gearbox assembly for a gas turbine engine used in an aircraft having passive lubrication capabilities during wind milling includes a gearbox housing, a gear train assembly housed within the gearbox housing, a lubricant in the gearbox housing for lubricating the gear train assembly, and a first scavenge port formed in the gearbox housing. The first scavenge port is changeable between an open position and a closed position. Further, the first scavenge port remains in the open position during normal operation of the gas turbine engine to allow the lubricant to drain from the gearbox housing. Upon occurrence of a loss of lubricant pressure in the gearbox assembly, the first scavenge port is changed to the closed position to trap at least a portion of the lubricant in the gearbox housing. Thus, the trapped lubricant provides passive lubrication to the gear train assembly during the loss of lubricant pressure.

17 Claims, 9 Drawing Sheets

(56) References Cited

U.S. PATENT DOCUMENTS

| | | | |
|---|---|---|---|
| 6,223,616 B1* | 5/2001 | Sheridan | F16H 1/2827 |
| | | | 184/6.12 |
| 6,463,819 B1 | 10/2002 | Rago | |
| 7,014,419 B2* | 3/2006 | Farnsworth | F01D 25/183 |
| | | | 137/855 |
| 7,367,427 B2* | 5/2008 | Gaines | F01D 25/18 |
| | | | 184/6.11 |
| 7,413,054 B2* | 8/2008 | El-Ibiary | F16C 33/1085 |
| | | | 184/6.22 |
| 7,662,059 B2 | 2/2010 | McCune | |
| 8,230,974 B2 | 7/2012 | Parnin | |
| 8,800,720 B2* | 8/2014 | Motto | F01D 25/18 |
| | | | 184/6.12 |
| 8,813,607 B2 | 8/2014 | Blewett et al. | |
| 9,458,923 B2* | 10/2016 | Poster | F16H 57/027 |
| 9,624,798 B2* | 4/2017 | Mullen | B64C 27/14 |
| 9,695,837 B2 | 7/2017 | Sinusas et al. | |
| 9,765,875 B2 | 9/2017 | Sheridan | |
| 9,784,150 B2* | 10/2017 | Marthaler | F01M 11/061 |
| 9,879,608 B2* | 1/2018 | Sheridan | F02C 7/16 |
| 9,903,227 B2* | 2/2018 | Cigal | F01D 25/20 |
| 10,145,276 B2* | 12/2018 | Parnin | F01M 11/10 |
| 10,145,464 B2* | 12/2018 | Poster | F16H 57/027 |
| 10,267,233 B2* | 4/2019 | Mastro | F01D 25/20 |
| 10,316,856 B2* | 6/2019 | Miller | F01D 25/18 |
| 2016/0010563 A1 | 1/2016 | Sheridan | |
| 2017/0152859 A1 | 6/2017 | Miller et al. | |

OTHER PUBLICATIONS

European Search Report Corresponding to Application No. 19158776 dated Jun. 21, 2019.

* cited by examiner

PASSIVE LUBRICATION SYSTEM FOR GAS TURBINE ENGINE GEARBOX DURING WIND MILLING

FIELD

The present invention relates generally to gas turbine engines, and more particularly, to passive lubrication systems for gas turbine engine gearboxes during wind milling.

BACKGROUND

A gas turbine engine generally includes a fan and a core section arranged in flow communication with one another. Additionally, the core section of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the combustion section drives the combustion section and is then routed through the exhaust section, e.g., to atmosphere. In particular configurations, the turbine section is mechanically coupled to the compressor section by one or more shafts extending along an axial direction of the gas turbine engine. Such gas turbine engines are commonly used in aircraft.

The fan includes a plurality of blades having a radius larger than the core section of the gas turbine engine. The fan and the plurality of blades are typically driven by one of the shafts. However, for efficiency reasons, it can be beneficial to have the plurality of blades of the fan rotate at a speed less than a speed at which the respective shaft is rotating. Accordingly, a power gearbox is provided in certain gas turbine engines to mechanically couple the fan to the respective shaft in such a manner that allows the fan to rotate at a slower and more efficient speed. The gas turbine engine additionally includes a lubrication system for providing lubricant to one or more portions of the gas turbine engine, such as sumps of the compressor and turbine sections of the core section and the power gearbox.

During wind milling of aircraft engines, the oil pumps are ineffective due to the slow rotor speeds. In some instances, the engines may be wind milling because of a primary oil pressure failure and subsequent engine shutdown. The wind milling elapsed time may be very long, e.g. around 180 minutes. During wind milling, the bearings and gears of the main shafts turn, but are not receiving any new lubrication. In a power gearbox with rolling element planet bearings, the bearing part of the planet system may be durable enough to survive wind milling, however, the teeth of the planet gear, sun gear, and/or ring gear may not survive during an extended oil off condition. Existing systems rely on auxiliary reservoirs or oil tanks and powered pump systems to ensure some oil circulation and lubrication of the various components. Such active systems, however, can be heavy, complex, and unreliable.

Accordingly, a gas turbine engine having a simplified passive lubrication system for the power gearbox during wind milling would be particularly useful. Thus, the present disclosure is directed to a passive lubrication system for the power gearbox of the gas turbine engine during wind milling that utilizes the "hidden oil" coating the walls of the gearbox during normal operation and, if necessary, supplemented by an auxiliary reservoir.

BRIEF DESCRIPTION

Aspects and advantages of the invention will be set forth in part in the following description, or may be obvious from the description, or may be learned through practice of the invention.

In one aspect, the present disclosure is directed to a gearbox assembly for a gas turbine engine used in an aircraft. The gearbox assembly includes a gearbox housing, a gear train assembly housed within the gearbox housing, a lubricant in the gearbox housing for lubricating the gear train assembly, and a first scavenge port formed in the gearbox housing. The first scavenge port is changeable between an open position and a closed position. Further, the first scavenge port remains in the open position during normal operation of the gas turbine engine to allow the lubricant to drain from the gearbox housing. Upon occurrence of a loss of lubricant pressure in the gearbox assembly, the first scavenge port is changed to the closed position to trap at least a portion of the lubricant in the gearbox housing. Thus, when of sufficient volume, the trapped lubricant provides passive lubrication to the gear train assembly during the loss of lubricant pressure.

In another aspect, the present disclosure is directed to a method for lubricating a gearbox assembly of an aircraft engine. The gearbox assembly has a gear train assembly housed within a gearbox housing. The method includes monitoring a lubricant pressure of the gearbox assembly via one or more sensors. The method also includes maintaining a scavenge port of the gearbox housing in an open position if the lubricant pressure is above a predetermined threshold to allow lubricant to drain from the gearbox housing. If the lubricant pressure drops below the predetermined threshold, the method includes changing the scavenge port from the open position to a closed position to trap at least a portion of the lubricant in the gearbox housing. As such, the trapped lubricant provides passive lubrication to the gear train assembly during the loss of lubricant pressure. It should be understood that the method may further include any of the additional steps and/or features as described herein.

In yet another aspect, the present disclosure is directed to a method for lubricating a gearbox assembly of an aircraft engine. The gearbox assembly has a gear train assembly housed within a gearbox housing. During normal operation of the aircraft engine, the method includes maintaining a scavenge port of the gearbox housing in an open position to allow lubricant to drain from the gearbox housing. Immediately upon occurrence of an inflight shutdown, the method includes changing the scavenge port to a closed position to trap at least a portion of the lubricant in the gearbox housing, the trapped lubricant providing passive lubrication to the gear train assembly via wind milling during the inflight shutdown. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
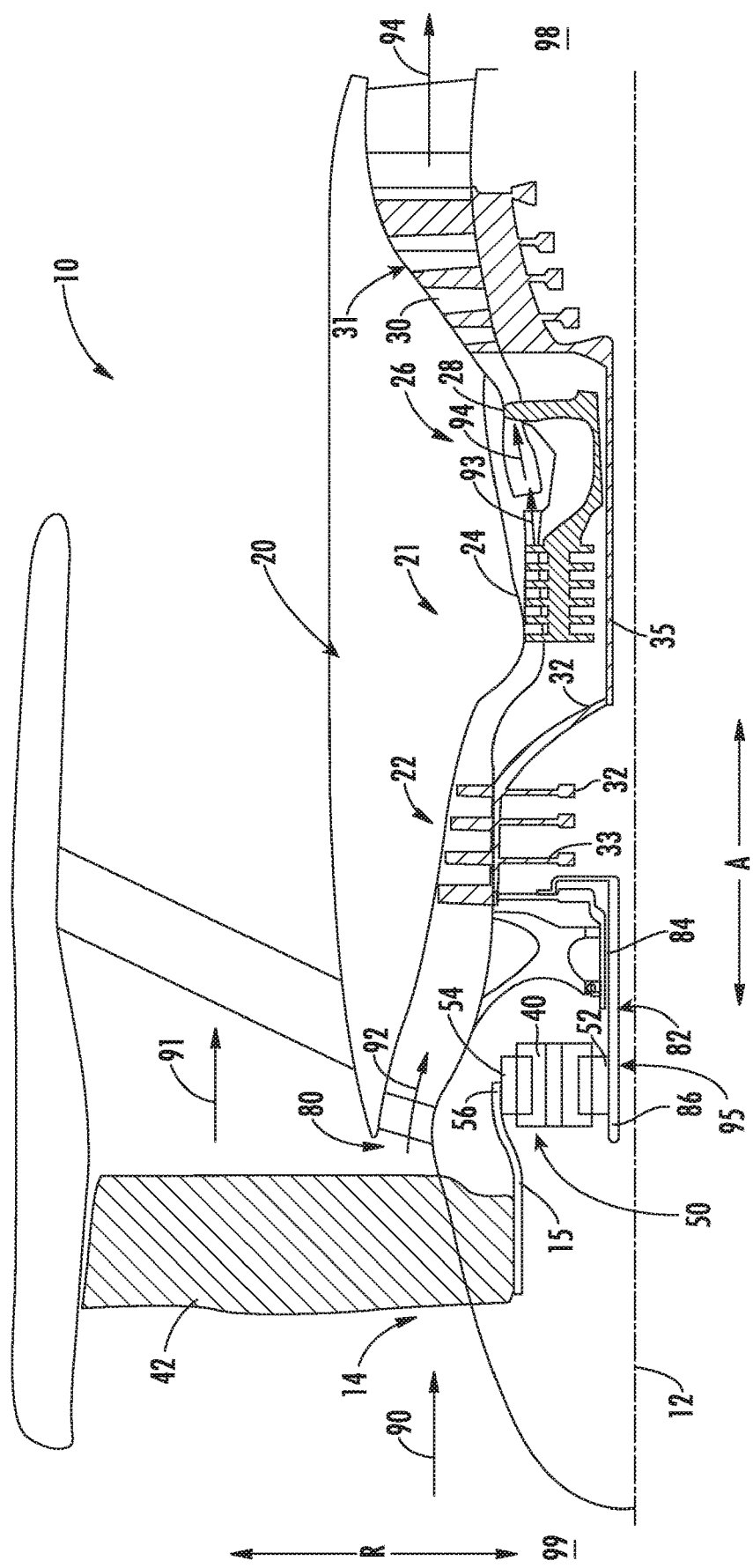
FIG. 1 illustrates a schematic cross sectional view of one embodiment of a gas turbine engine according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a gearbox assembly for a gas turbine engine used in an aircraft having passive lubrication capabilities during wind milling. The gearbox assembly includes a gearbox housing, a gear train assembly housed within the gearbox housing, a lubricant in the gearbox housing for lubricating the gear train assembly (such as oil), and at least one scavenge port formed in the gearbox housing. As such, the scavenge port(s) is closed immediately after a lubricant pressure loss to allow the in-transit, hidden oil to drain to the bottom of the gearbox housing to create a pool in which the bottom gear teeth of the ring gear are partially submerged. Thus, the gear teeth are passively lubricated at each pass by rotating through the bottom oil puddle of the gearbox housing during wind milling. In addition, oil is transferred to the other gear teeth that are not in direct contact with the pool.

Figure 2:
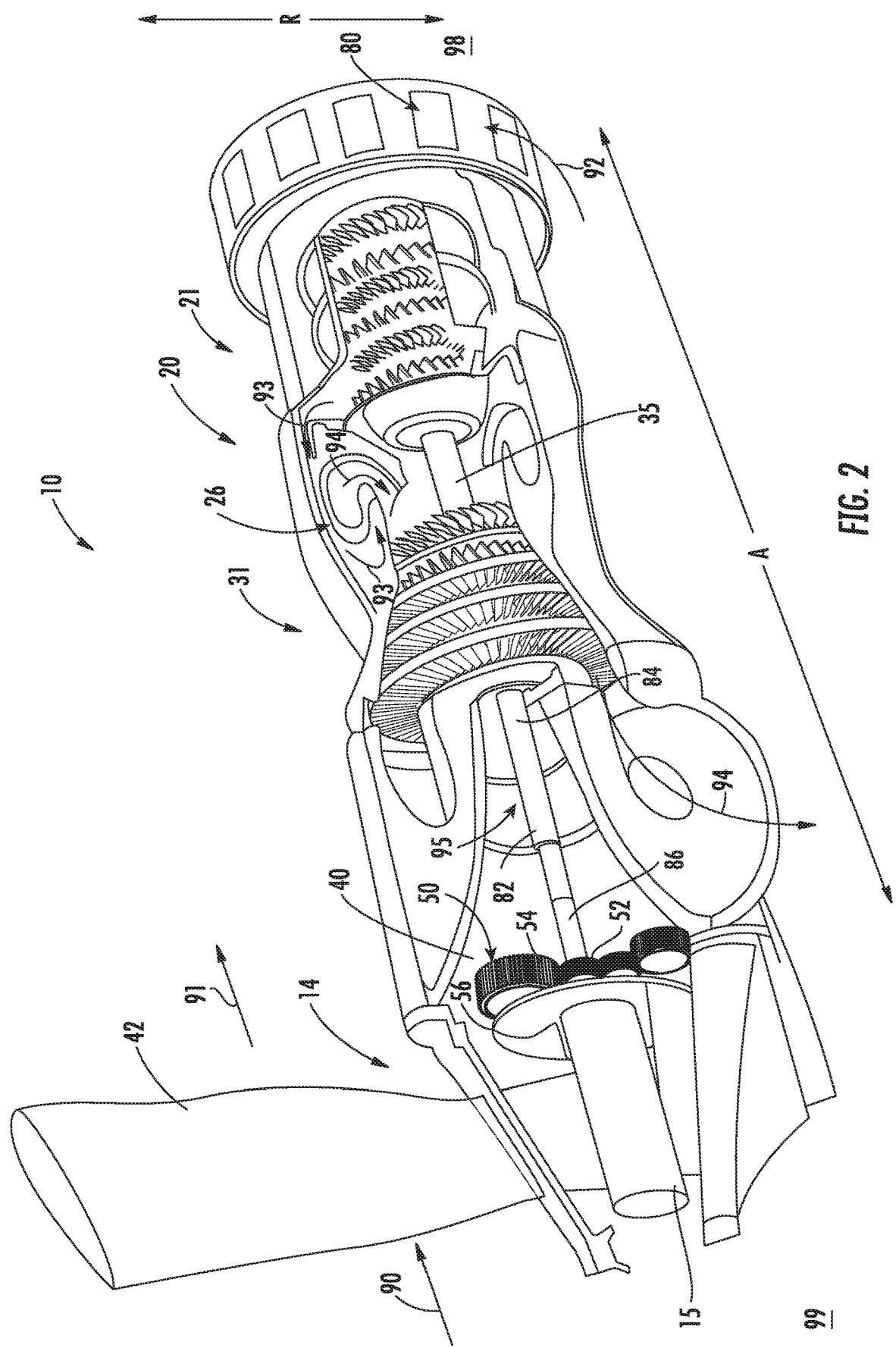
FIG. 2 illustrates a schematic cross sectional view of another embodiment of a gas turbine engine according to the present disclosure.

Referring now to the drawings, FIGS. 1 and 2 each illustrate schematic cross sectional views of a gas turbine engine 10 (herein referred to as "engine 10"). As shown in FIG. 1, the engine 10 is depicted as a high bypass turbofan engine, incorporating an exemplary embodiment of a shaft assembly 95 according to an aspect of the present disclosure. As shown in FIG. 2, the engine 10 is shown as a turboprop engine incorporating an exemplary embodiment of the shaft assembly 95 according to an aspect of the present disclosure. Although further described below with reference to a turbofan engine and/or a turboprop engine, the present disclosure is also applicable to wind turbines and turbomachinery in general, including propfan, turbojet, and turboshaft gas turbine engines, including marine and industrial turbine engines and auxiliary power units. As shown in FIGS. 1 and 2, the engine 10 has an axial centerline axis 12 that extends there through for reference purposes. The engine 10 defines an axial direction A, a radial direction R, and a forward end 99 and an aft end 98 along the axial direction A.

In general, the engine 10 may include an engine core 20 and a fan or propeller assembly 14. The engine core 20 may generally include, in serial flow arrangement, a compressor section 21, a combustion section 26, and a turbine section 31. The compressor section 21 may define one or more compressors, such as a high pressure compressor (HPC) 24 and a low pressure compressor (LPC) 22. The turbine section 31 may define one or more turbines, such as a high pressure turbine (HPT) 28 and a low pressure turbine (LPT) 30. In various embodiments, the compressor section 21 may further include an intermediate pressure compressor (IPC). In still other embodiments, the turbine section 31 may further include an intermediate pressure turbine (IPT). In wind turbine applications, the engine core 20 may generally be defined as one or more generators.

Each of the compressors 22, 24 in the compressor section 21 and each of the turbines 28, 30 in the turbine section 31 may include one or more rotors 32. In one embodiment, the rotors 32 include one or more shafts 35 of the engine 10 connecting the compressor section 21 to the turbine section 31. In other embodiments, the rotors 32 generally define a disk 33 extended in the radial direction R and a plurality of airfoils 36 connected in a circumferentially adjacent arrangement and extending outward in the radial direction R from the disk 33. In one embodiment, the one or more rotors 32 may each be connected together. For example, each rotor 32 of the turbine section 31 or the compressor section 21 may be connected by mechanical fasteners, such as bolts, nuts, screws, or rivets, or by a bonding process, such as welding, friction bonding, diffusion bonding, etc. In various embodiments, one or more compressors of the compressor section 21 may be drivingly connected and rotatable with one or more turbines of the turbine section 31 by way of the one or more shafts 35.

The fan or propeller assembly 14 generally includes a fan rotor 15. The fan rotor 15 includes a plurality of fan or propeller blades 42 that are coupled to and extend outwardly from the fan rotor 15 in the radial direction R. In the embodiments shown in FIGS. 1 and 2, the fan rotor 15 may extend in the axial direction A toward the forward end 99 from a reduction or power gearbox assembly 40. The fan or propeller assembly 14 further includes the shaft assembly 95 coupled to the gearbox assembly 40 and extended toward the aft end 98 and coupled to the engine core 20.

In one embodiment, the gearbox assembly 40 may include a gear train assembly 50 having any suitable configuration, such as a planetary configuration or a star configuration. For example, as shown in the illustrated embodiment, the gear train assembly 50 includes a sun gear 52 and a plurality of planet gears 54. The plurality of planet gears 54 may each be fixed such that each planet gear 54 rotates on a fixed axis relative to the sun gear 52. A ring gear 56 surrounds the plurality of planet gears 54 and rotates and transfers power and torque from the sun gear 52 through the plurality of planet gears 54. In the embodiments shown herein, the ring gear 56 may be coupled to or otherwise integral with the fan rotor 15. In one embodiment, the sun gear 52 may be attached to, or integral to, the shaft assembly 95. In various embodiments, the gearbox assembly 40 may further include additional planet gears disposed radially between the plurality of planet gears 54 and the sun gear 52, or between the plurality of planet gears 54 and the ring gear 56.

Referring back to FIGS. 1 and 2, the shaft assembly 95 is connected to the engine core 20 to transmit torque and power through the sun gear 52 to the gearbox assembly 40 to the fan rotor 15. The fan rotor 15 may be connected to the surrounding ring gear 56 or the planet gears 54 to receive torque from the sun gear 52 and transfer torque to drive the fan or propeller assembly 14. As power and torque are transmitted from the engine core 20, the gearbox assembly 40 provides power and torque at an output speed to the fan rotor 15 more suitably adjusted for the fan or propeller assembly 14. For example, the gearbox assembly 40 may reduce fan rotor 15 speed relative to the engine core 20 by a factor greater than one.

During operation of the engine 10, as shown and described in regard to FIGS. 1-2 collectively, a volume of air as indicated schematically by arrows 90 enters the engine 10. As the air 90 passes across the fan or propeller blades 42, a portion of the air as indicated schematically by arrows 91 is directed or routed outside of the engine core 20 to provide propulsion. Additionally, another portion of air as indicated schematically by arrows 92 is directed or routed through an associated inlet 80 into the compressor section 21. The air 92 is progressively compressed as it flows through the compressor section 21, such as through the LPC 22 and the HPC 24, toward the combustion section 26.

The now compressed air as indicated schematically by arrows 93 flows into the combustion section 26 where a fuel is introduced, mixed with at least a portion of the compressed air 93, and ignited to form combustion gases 94. The combustion gases 94 flow into the turbine section 31, causing rotary members of the turbine section 31 to rotate and support operation of respectively coupled rotary members in the compressor section 21 and/or fan or propeller assembly 14. For example, the HPC 24 and the HPT 28 may be coupled and rotatable to drive the engine 10 and generate combustion gases 94 at the combustion section 26 to drive the LPT 30. The LPT 30 may be connected to the LPC 22. Referring to FIG. 1, the coupling shaft 82 may be attached to the LPC 22 at the first end 84 and to the gearbox assembly 40 at the second end 86. In other embodiments, the flexible coupling 82 shaft may be attached to the HPC 24 at the first end 84. Referring to FIG. 2, the coupling shaft 82 may be attached to the turbine section 31 at the first end 84 and to the gearbox assembly 40 at the second end 86. In other embodiments the coupling shaft 82 may be attached to the HPT 28 at the first end 84. The gearbox assembly 40 may reduce the rotational speed from the engine core 20 (e.g. the compressor section 21 or the turbine section 31) and provide a desired amount of torque and rotational speed to the fan or propeller assembly 14.

Figure 3:
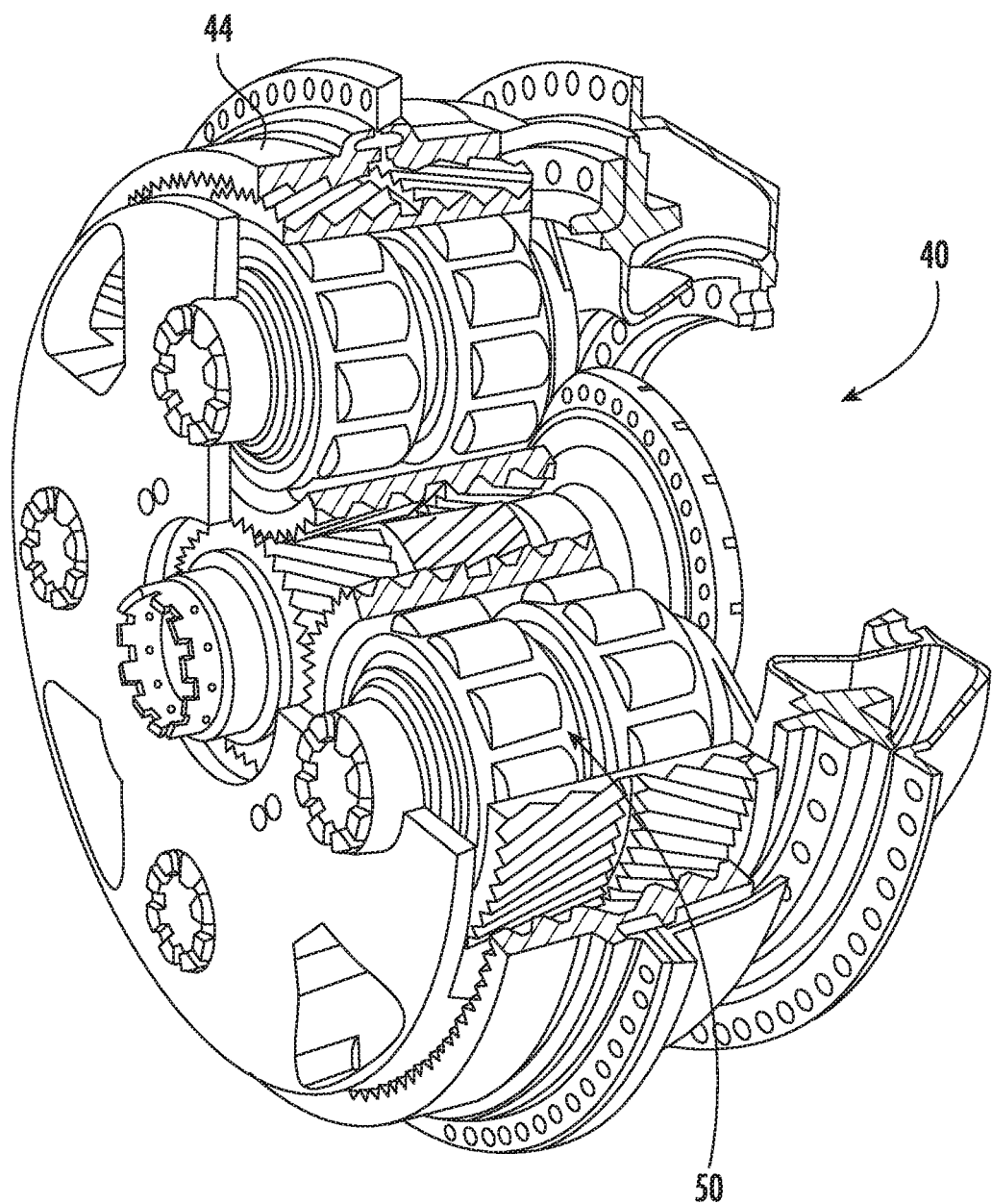
FIG. 3 illustrates a cut-away perspective view of a gearbox assembly of a gas turbine engine according to the present disclosure.
Figure 4:
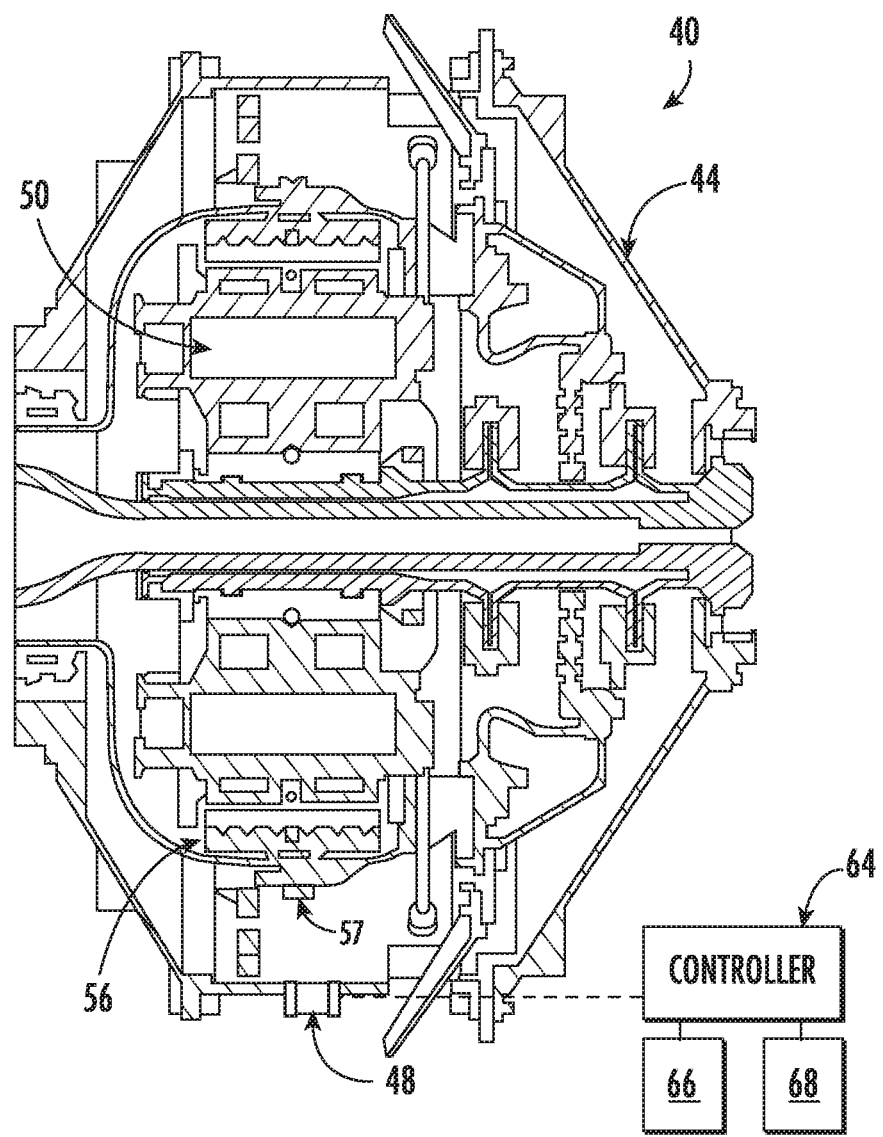
FIG. 4 illustrates a cross-sectional view of a gearbox assembly of a gas turbine engine according to the present disclosure, particularly illustrating a scavenge port of the gearbox housing in an open position.
Figure 5:
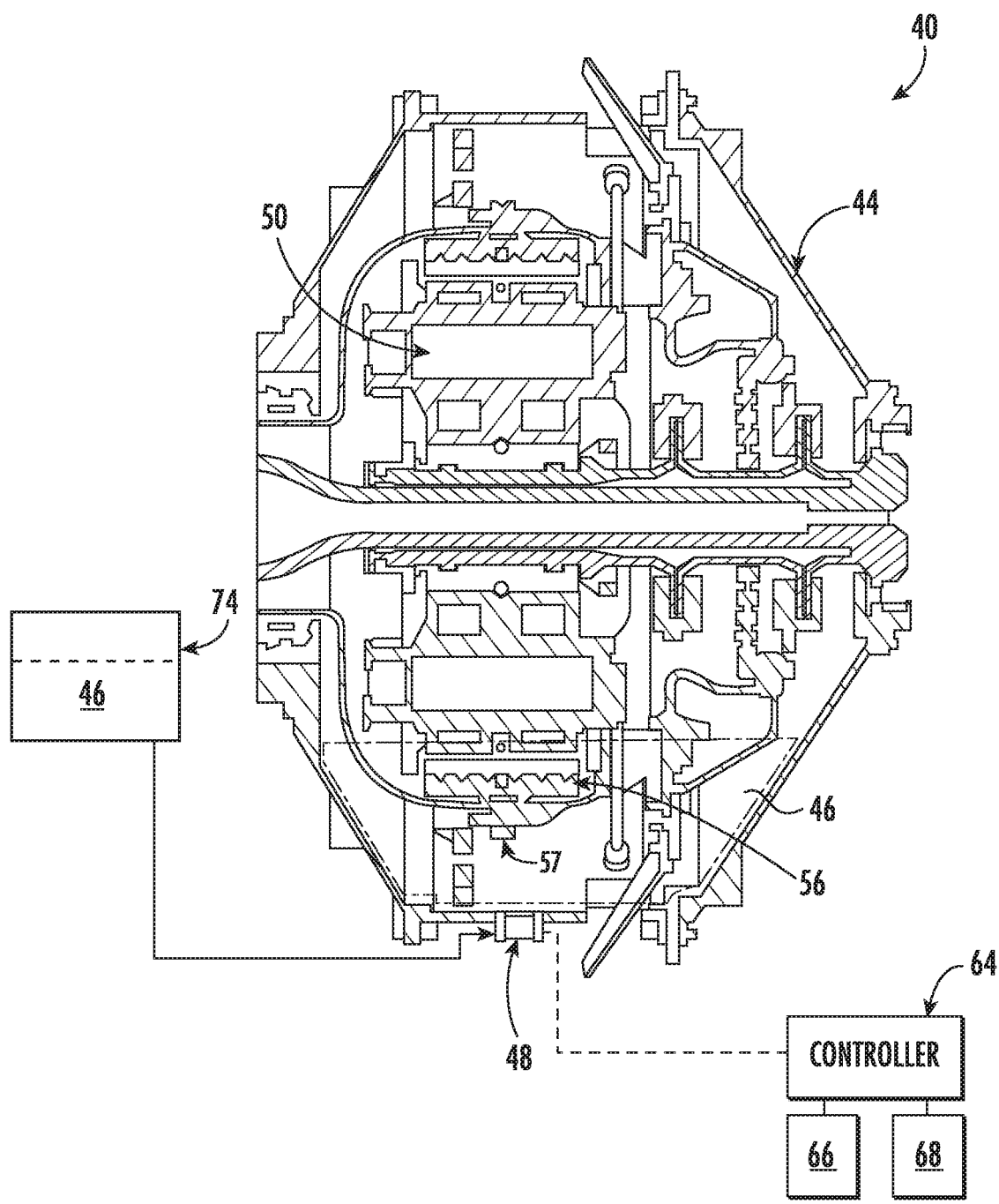
FIG. 5 illustrates a cross-sectional view of a gearbox assembly of a gas turbine engine according to the present disclosure, particularly illustrating a scavenge port of the gearbox housing in a closed position to create a pool of lubricant in the bottom of the gearbox housing for lubricating the gear train assembly therein.

Referring now to FIGS. 3-5, various views of the gearbox assembly 40 for the gas turbine engine 10 are illustrated. As shown, the gearbox assembly 40 includes a gearbox housing 44, the gear train assembly 50 housed within the gearbox housing 44, a lubricant 46 in the gearbox housing 44 for lubricating the gear train assembly 50, and a first scavenge port 48 formed in the gearbox housing 44. As shown particularly in FIGS. 4 and 5, the first scavenge port 48 is changeable between an open position and a closed position. More specifically, the first scavenge port 48 remains in the open position (FIG. 4) during normal operation of the gas turbine engine 10 to allow the lubricant 46 to drain from the gearbox housing 44. Upon occurrence of a loss of lubricant pressure in the gearbox assembly 40, the first scavenge port 48 is changed to the closed position (FIG. 5) to trap at least a portion of the lubricant 46 in the gearbox housing 44. Thus, as shown in FIG. 5, the trapped lubricant 46 provides passive lubrication to the gear train assembly 40 during the loss of lubricant pressure. In one embodiment, the loss of lubricant pressure may correspond to an inflight shutdown.

More specifically, as shown in the illustrated embodiment, the gearbox assembly 40 may include a controller 64 configured to control operation thereof. In such embodiments, the controller 64 may receive a signal representative of an operational status of the gas turbine engine 10, e.g. via one or more sensors 66, 68. The controller 64 may then determine a position for the first scavenge port 48 based on the operational status. Thus, if the operational status is normal, the controller 64 is configured to maintain the first scavenge port 48 in the open position (FIG. 4) to allow the lubricant 46 to drain from the gearbox housing 44, and if the operational status indicates a loss of lubricant pressure, the controller 64 is configured to send a signal to the first scavenge port 48 to move to the closed position (FIG. 5) to trap at least a portion of the lubricant in the gearbox housing 44. Thus, as shown particularly in FIG. 5, the gearbox housing 44 may be designed to accommodate a predetermined volume of lubricant under the ring gear 56 that creates a pool of lubricant 46 during the loss of lubricant pressure (e.g. due to an inflight shut down) that contacts at least a portion of a gear tooth of the ring gear 56. Alternatively, as shown in FIGS. 4 and 5, the ring gear 56 may include one or more scoops 57 positioned on an outer surface thereof. Such scoops 57 are configured to scoop a small amount of lubricant 46 from the pool and transfer the lubricant 46 within the ring gear 56, e.g. via one or more passages (not shown). In such embodiments, the scoops 57 allow for a smaller amount of hidden oil to be collected in the gearbox 40.

In certain embodiments, the controller 64 may also be further configured to determine an amount of lubricant 46 remaining in the gearbox housing 44 after loss of lubricant pressure. In such embodiments, the controller 64 may also determine whether an additional lubricant reservoir 74 is needed based on the amount. Thus, as shown in FIG. 5, the additional lubricant reservoir 74 is configured to drain into the gearbox housing 44 during the loss of lubricant pressure after the first scavenge port 48 changes to the closed position. As such, the controller 64 is configured to tune the amount of lubricant 46 remaining in the gearbox housing 44 after loss of lubricant pressure, e.g. via the first scavenge port 48 and the optionally reservoir 74.

Figure 8:
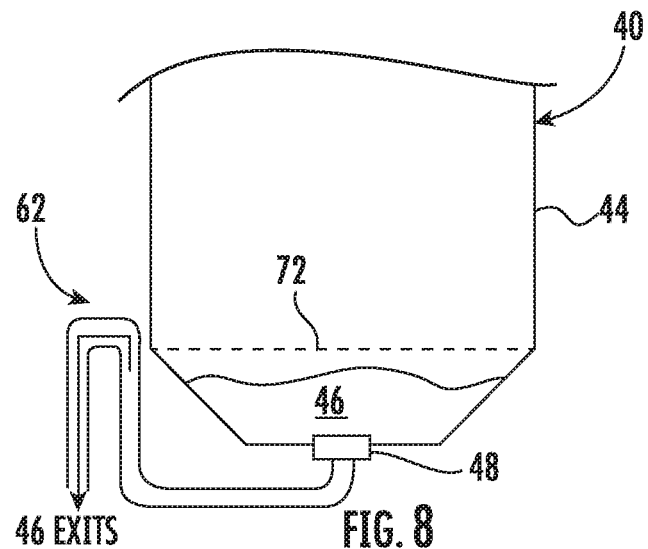
FIG. 8 illustrates a schematic diagram of one embodiment of a hydrostatic loop that may be used in a scavenge port of the gearbox housing according to the present disclosure.
Figure 9:
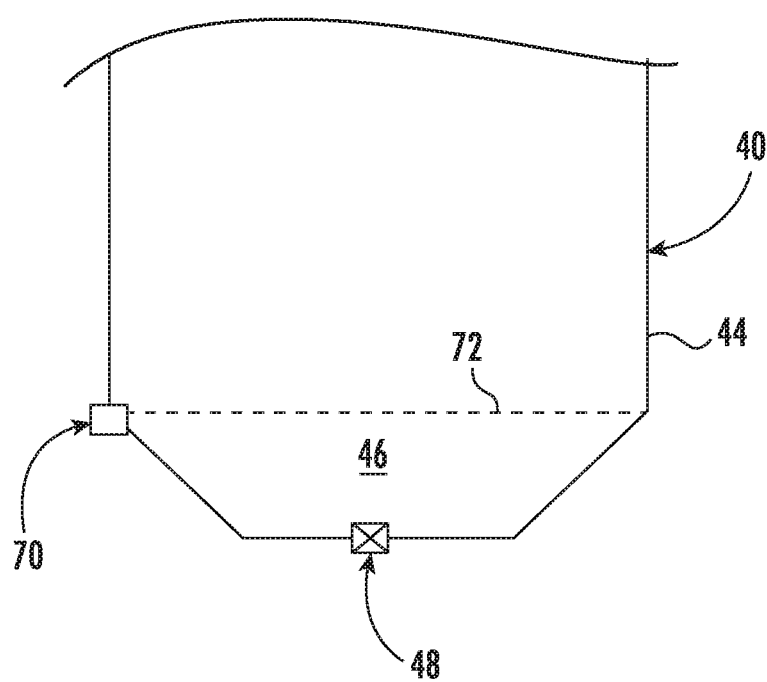
FIG. 9 illustrates a partial cross-sectional view of a gearbox housing according to the present disclosure, particularly illustrating a closed scavenge port and an open bypass scavenge port.

The first scavenge port(s) 48 described herein may be located in any suitable position on the gearbox housing 44 to allow passage of the lubricant therethrough. For example, as shown generally in FIGS. 3-5 and 8, the first scavenge port 48 may be formed in a lower half of the gearbox housing 44. More specifically, as shown in FIGS. 3-5, the first scavenge port 48 is located on the bottom of the gearbox housing 44. Alternatively, as shown in FIG. 8, the first scavenge port 48 is located on a side wall of the gearbox housing 44.

Figure 6:
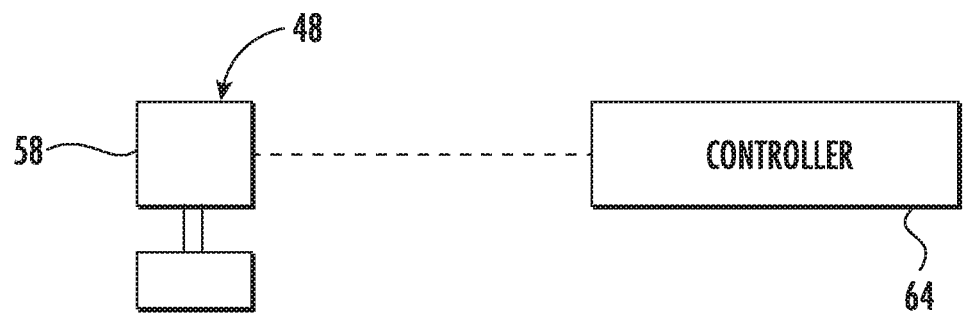
FIG. 6 illustrates a schematic diagram of one embodiment of an electrically-activated valve that may be used in a scavenge port of the gearbox housing according to the present disclosure.
Figure 7:
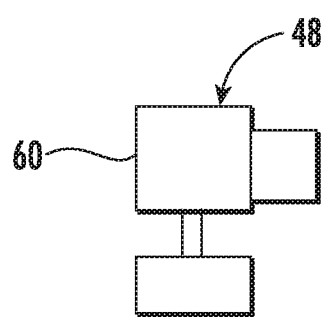
FIG. 7 illustrates a schematic diagram of one embodiment of an hydraulically-activated valve that may be used in a scavenge port of the gearbox housing according to the present disclosure.

In addition, the first scavenge port(s) 48 described herein may include any suitable valves and/or hydrostatic loops that allow the port to operate as desired. For example, as shown in FIG. 6, the first scavenge port 48 corresponds to an electrically-activated valve 58. Thus, as shown, the electrically-activated valve 58 may be communicatively coupled to the controller 64 such that the controller 64 can open and close the valve as needed. Alternatively, as shown in FIG. 7, the first scavenge port 48 may correspond to a hydraulically-activated valve 60. The hydraulically-activated valve 60 may also be optionally communicatively coupled to the controller 64. In still further embodiments, as shown in FIG. 8, the first scavenge port 48 may correspond to a hydrostatic loop 62. For example, as shown, the hydrostatic loop 62 requires the lubricant 46 to rise above a predetermined threshold 72 before the lubricant 46 can drain from the first scavenge port 48 after the loss of lubricant pressure.

In further embodiments, the gearbox assembly 40 may also include a plurality of scavenge ports, e.g. based on the amount of lubricant 46 that needs to be transferred into and/or out of the gearbox housing 44. Moreover, in certain embodiments, the gearbox assembly 40 may include one or more bypass scavenge ports 70 formed in the gearbox housing 44 above the pool of lubricant 46. Thus, in the event that the oil pump flows a small amount during wind milling, the bypass scavenge ports 70 may be positioned above the required lubricant pool level 72. Such positioning allows excess lubricant 46 to bypass the closed port 48 and prevent complete filling of the gearbox housing 44 during the course of a wind milling flight. The hydrostatic loop 62 option described herein would not need a separate bypass line.

Figure 10:
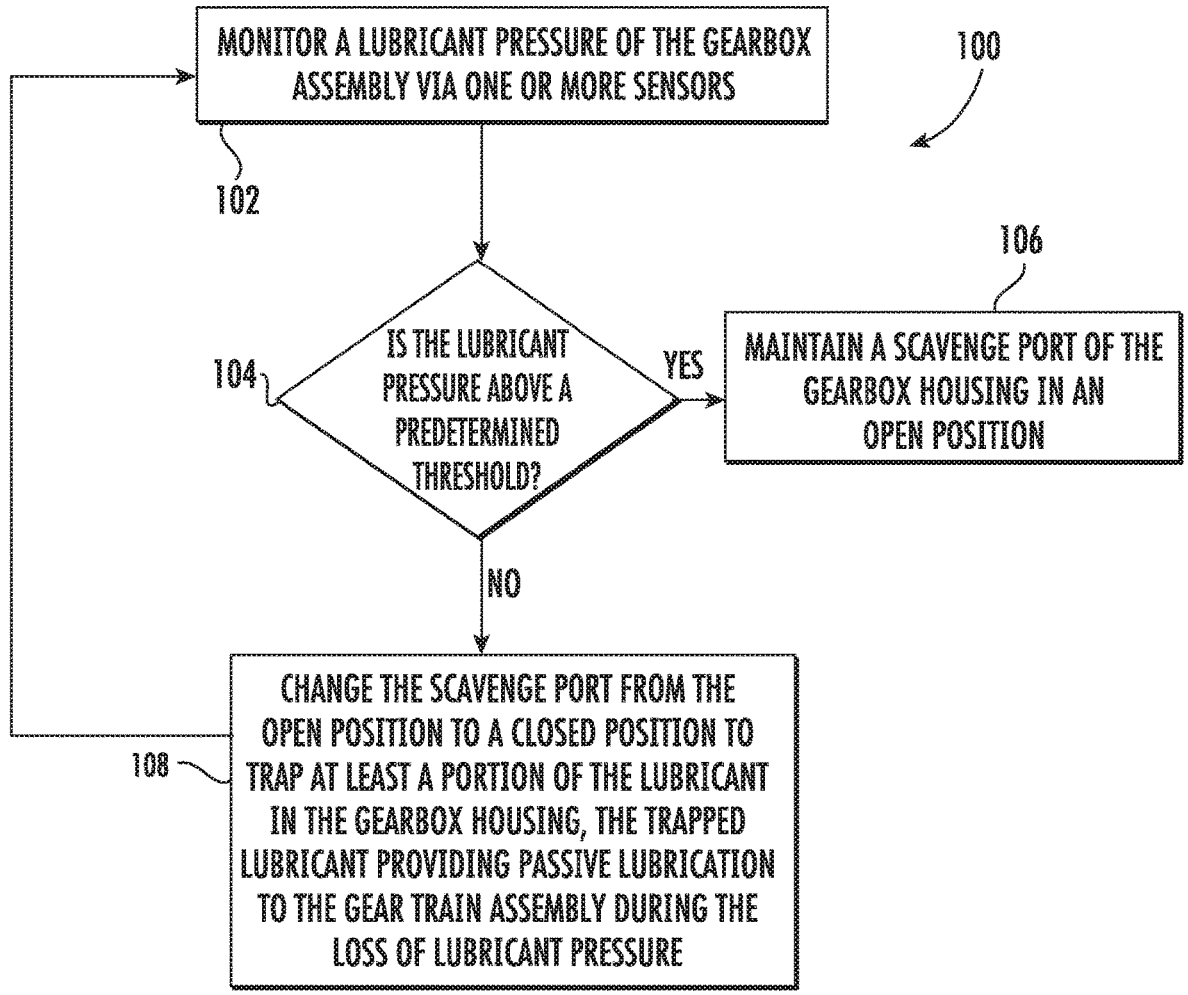
FIG. 10 illustrates a flow diagram of one embodiment of a method for lubricating a gearbox assembly of an aircraft engine according to the present disclosure.

Referring now to FIG. 10, a flow diagram of one embodiment of a method 100 for lubricating the gearbox assembly 40 of the aircraft engine 10 is illustrated. As shown at 102, the method 100 includes monitoring a lubricant pressure of the gearbox assembly 40 via one or more sensors. As shown at 104, the method 100 determines whether the lubricant pressure level is above a predetermined threshold. If so, meaning the engine is likely operating according to standard operation, as shown at 106, the method 100 includes maintaining the scavenge port 48 of the gearbox housing 44 in an open position to allow lubricant 46 to drain from the gearbox housing 44. If the lubricant pressure drops below the predetermined threshold, as shown at 108, the method 100 includes changing the scavenge port 48 from the open position to a closed position to trap at least a portion of the lubricant 46 in the gearbox housing 44. As such, the trapped lubricant 46 provides passive lubrication to the gear train assembly 50 during the loss of lubricant pressure.

In addition, as indicated by arrow 110, the method 100 may include monitoring the lubricant pressure of the gearbox assembly 44 after the lubricant pressure drops below the predetermined threshold and reopening the scavenge port 48 if the lubricant pressure increase above the predetermined threshold.

Figure 11:
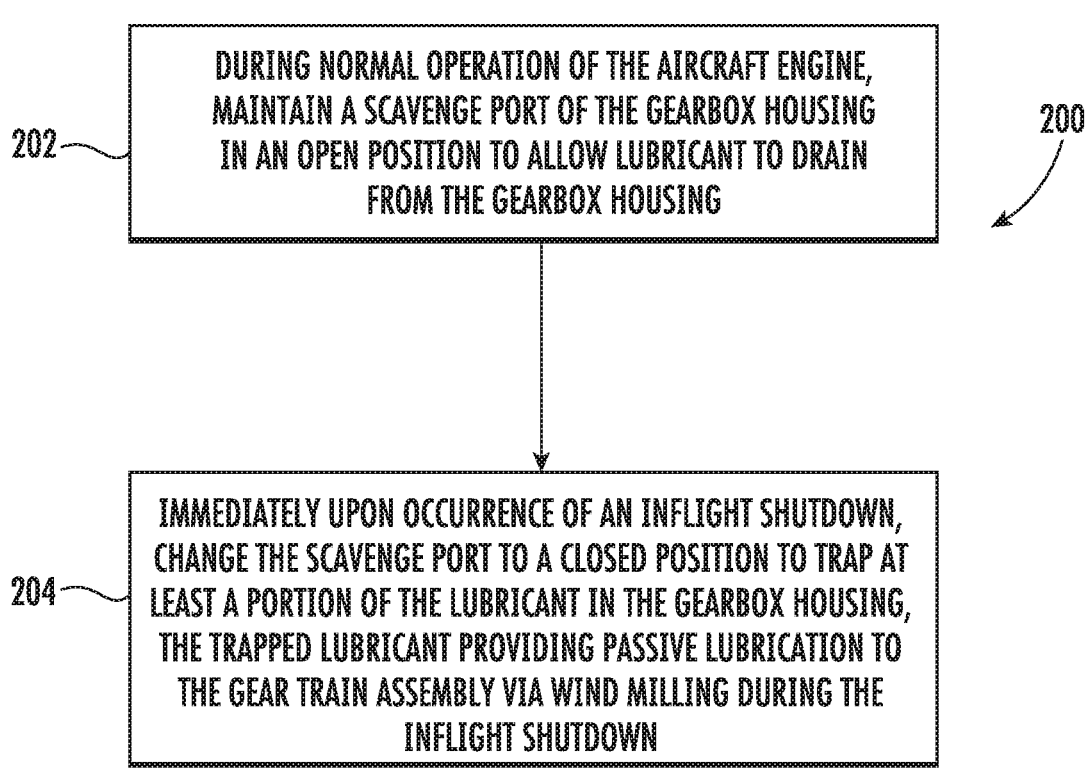
FIG. 11 illustrates a flow diagram of another embodiment of a method for lubricating a gearbox assembly of an aircraft engine according to the present disclosure.

Referring now to FIG. 11, a flow diagram of another embodiment of a method 200 for lubricating the gearbox assembly 40 of the aircraft engine 10 is illustrated. As shown at 202, the method 200 includes maintaining the scavenge port 48 of the gearbox housing 44 in an open position to allow lubricant to drain from the gearbox housing 44 during normal operation of the aircraft engine 10. Immediately upon occurrence of an inflight shutdown, as shown at 204, the method 200 includes changing the scavenge port 48 to a closed position to trap at least a portion of the lubricant 46 in the gearbox housing 44.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gearbox assembly for a gas turbine engine used in an aircraft, the gearbox assembly comprising:
   a gearbox housing;
   a gear train assembly housed within the gearbox housing, the gear train assembly comprising, at least, a ring gear;
   a lubricant in the gearbox housing for lubricating the gear train assembly;
   a first scavenge port formed in the gearbox housing, the first scavenge port changeable between an open position and a closed position, the first scavenge port remaining in the open position during normal operation of the gas turbine engine to allow the lubricant to drain from the gearbox housing,
   wherein, upon occurrence of a loss of lubricant pressure, the first scavenge port is changed to the closed position to trap at least a portion of the lubricant in the gearbox housing, the trapped lubricant providing passive lubrication to the gear train assembly during the loss of lubricant pressure, the gearbox housing comprising a predetermined volume under the ring gear that creates a pool of the lubricant during the loss of lubricant pressure that contacts at least a portion of a gear tooth of the ring gear; and
   a bypass scavenge port formed in the gearbox housing above the pool of lubricant.

2. The gearbox assembly of claim 1, wherein the occurrence of the loss of lubricant pressure comprises an inflight shutdown.

3. The gearbox assembly of claim 1, wherein the first scavenge port comprises one of an electrically-activated valve, a hydraulically-activated valve, or a hydrostatic loop, wherein the hydrostatic loop requires the lubricant to rise above a predetermined threshold before the lubricant can drain from the first scavenge port after the loss of lubricant pressure and/or scavenge suction.

4. The gearbox assembly of claim 3, further comprising a controller configured to control operation of the gearbox assembly, the controller communicatively coupled to the first scavenge port.

5. The gearbox assembly of claim 4, wherein the controller is configured to receive, via one or more sensors, a signal representative of an operational status of the gas turbine engine and determine a position of the first scavenge port based on the operational status.

6. The gearbox assembly of claim 5, wherein, if the operational status is normal, the controller maintains the first scavenge port in the open position to allow the lubricant to drain from the gearbox housing, and wherein, if the operational status indicates a loss of lubricant pressure, the controller sends a signal to the first scavenge port to move to the closed position to trap at least a portion of the lubricant in the gearbox housing.

7. The gearbox assembly of claim 1, wherein the gear train assembly comprises at least one of a planetary configuration or a star configuration, wherein the planetary configuration comprises a sun gear, a plurality of planet gears, and the ring gear surrounding the plurality of planet gears.

8. The gearbox assembly of claim 1, wherein the ring gear further comprises one or more scoops on an exterior surface thereof that collect lubricant during the loss of lubricant pressure.

9. The gearbox assembly of claim 1, wherein the controller is further configured to determine an amount of lubricant remaining in the gearbox housing after loss of lubricant pressure.

10. The gearbox assembly of claim 9, further comprising an additional lubricant reservoir configured to drain into the gearbox housing during the loss of lubricant pressure after the first scavenge port changes to the closed position if needed based on the amount.

11. The gearbox assembly of claim 9, wherein the first scavenge port is further configured to tune the amount of lubricant remaining in the gearbox housing after loss of lubricant pressure.

12. A method for lubricating a gearbox assembly of an aircraft engine, the gearbox assembly having a gear train assembly housed within a gearbox housing, the method comprising:

monitoring a lubricant pressure of the gearbox assembly via one or more sensors;

maintaining a scavenge port of the gearbox housing in an open position if the lubricant pressure is above a predetermined threshold to allow lubricant to drain from the gearbox housing;

if the lubricant pressure drops below the predetermined threshold, changing the scavenge port from the open position to a closed position to trap at least a portion of the lubricant in the gearbox housing, the trapped lubricant providing passive lubrication to the gear train assembly during the loss of lubricant pressure; and determining an amount of lubricant remaining in the gearbox housing after the lubricant pressure drops below the predetermined threshold.

13. The method of claim 12, further comprising providing a bypass scavenge port in the gearbox housing above the pool of lubricant.

14. The method of claim 12, further comprising determining whether an additional lubricant reservoir is needed based on the amount, the additional lubricant reservoir configured to drain into the gearbox housing during the loss of lubricant pressure after the first scavenge port changes to the closed position; and, if needed, sizing the additional lubricant reservoir based on the amount.

15. The method of claim 14, further comprising tuning the amount of lubricant remaining in the gearbox housing after the lubricant pressure drops below the predetermined threshold.

16. The method of claim 12, further comprising monitoring the lubricant pressure of the gearbox assembly after the lubricant pressure drops below the predetermined threshold and reopening the scavenge port if the lubricant pressure increase above the predetermined threshold.

17. A method for lubricating a gearbox assembly of an aircraft engine, the gearbox assembly having a gear train assembly housed within a gearbox housing, the method comprising:

during normal operation of the aircraft engine, maintaining a scavenge port of the gearbox housing in an open position to allow lubricant to drain from the gearbox housing;

immediately upon occurrence of an inflight shutdown, changing the scavenge port to a closed position to trap at least a portion of the lubricant in the gearbox housing, the trapped lubricant providing passive lubrication to the gear train assembly via wind milling during the inflight shutdown; and determining whether an additional lubricant reservoir is needed based on an amount of the lubricant remaining in the gearbox after the inflight shutdown.

* * * * *